US012631081B1

(12) United States Patent
Steele et al.

(10) Patent No.: US 12,631,081 B1
(45) Date of Patent: May 19, 2026

(54) PUMP DOWN FIBER SYSTEM, METHOD AND TOOLS FOR MULTILATERAL WELLS

(71) Applicant: Halliburton Energy Services, Inc., Houston, TX (US)

(72) Inventors: David Steele, Carrollton, TX (US); Matthew Bradley Stokes, Carrollton, TX (US); Stacey Blaine Donovan, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/055,453

(22) Filed: Feb. 17, 2025

(51) Int. Cl.
| | |
|---|---|
| *E21B 23/14* | (2006.01) |
| *E21B 41/00* | (2006.01) |
| *E21B 47/135* | (2012.01) |
| *G02B 6/52* | (2006.01) |

(52) U.S. Cl.
CPC .......... *E21B 23/14* (2013.01); *E21B 41/0035* (2013.01); *E21B 47/135* (2020.05); *G02B 6/52* (2013.01)

(58) Field of Classification Search
CPC .... E21B 17/023; E21B 17/025; E21B 17/026; E21B 17/028; E21B 23/08; E21B 23/10; E21B 23/12; E21B 23/14; E21B 41/0335; E21B 47/135; G02B 6/52
See application file for complete search history.

(56) References Cited

U.S. PATENT DOCUMENTS

| | | | | | |
|---|---|---|---|---|---|
| 3,378,811 | A | * | 4/1968 | Cullen | H01R 13/523 |
| | | | | | 439/425 |
| 4,027,730 | A | * | 6/1977 | Sparlin | E21B 23/10 |
| | | | | | 166/156 |
| 5,377,762 | A | * | 1/1995 | Turner | E21B 23/12 |
| | | | | | 166/347 |

(Continued)

FOREIGN PATENT DOCUMENTS

| | | | | | |
|---|---|---|---|---|---|
| CN | 113969752 | A | * | 1/2022 | E21B 17/023 |
| CN | 117967258 | A | * | 5/2024 | E21B 47/07 |

(Continued)

OTHER PUBLICATIONS

TCO. "Chemical Injection Valve Technology Utilized in Combination with Fiber Deployment in Harsh Well Conditions." TCO Case Study Data Sheet, 2020. PDF file. 2 pages.

(Continued)

*Primary Examiner* — Jennifer H Gay
(74) *Attorney, Agent, or Firm* — Scott Richardson; C. Tumey Law Group PLLC

(57) ABSTRACT

A downhole system may include a plurality of conduits configured to interconnect, via at least one stab-in connection, to form at least one fiber channel extending along a portion of a wellbore. The downhole system may also include at least one fiber optic line configured to extend through at least a portion of the fiber channel from a surface position to a downhole position. Further, the downhole system may include a plug secured to leading end of the fiber optic line. The plug is configured to move along the at least (Continued)

100 —↘ one fiber channel in response to fluid pressure in the at least one fiber channel to drive the leading end of the at least one fiber optic line along the at least one fiber channel from the surface position to at least the downhole position.

26 Claims, 8 Drawing Sheets

(56) References Cited

U.S. PATENT DOCUMENTS

| | | | | |
|---|---|---|---|---|
| 5,527,135 A * | 6/1996 | Hayashi | E21B 33/14 | 405/184 |
| 5,573,225 A * | 11/1996 | Boyle | E21B 17/206 | 254/134.4 |
| 5,804,713 A * | 9/1998 | Kluth | E21B 47/01 | 175/323 |
| 6,170,578 B1 * | 1/2001 | Edwards | E21B 33/035 | 166/359 |
| 6,266,465 B1 | 7/2001 | Hickey | | |
| 6,402,524 B2 * | 6/2002 | Wurm | E21B 3/02 | 439/32 |
| 6,532,839 B1 | 3/2003 | Kluth et al. | | |
| 6,863,130 B2 | 3/2005 | Steele et al. | | |
| 6,955,218 B2 * | 10/2005 | Coon | E21B 47/135 | 166/250.01 |
| 7,163,055 B2 | 1/2007 | Coon et al. | | |
| 7,222,676 B2 * | 5/2007 | Patel | E21B 43/086 | 166/278 |
| 7,225,875 B2 | 6/2007 | Steele et al. | | |
| 7,594,763 B2 * | 9/2009 | Richards | G01V 1/52 | 166/385 |
| 7,845,419 B2 | 12/2010 | Naumann | | |
| 7,900,699 B2 * | 3/2011 | Ramos | E21B 47/10 | 166/250.01 |
| 7,950,467 B2 * | 5/2011 | Hansen | E21B 23/08 | 166/380 |
| 8,082,983 B2 * | 12/2011 | Patel | E21B 17/028 | 166/313 |
| 8,844,627 B2 * | 9/2014 | Wetzel | A45C 13/02 | 166/250.14 |
| 8,936,078 B2 * | 1/2015 | Richards | E21B 29/04 | 166/242.6 |
| 9,291,789 B2 * | 3/2016 | Michaelis | E21B 41/00 | |
| 9,388,686 B2 | 7/2016 | Konopczynski et al. | | |
| 9,803,429 B2 * | 10/2017 | Rodriguez | E21B 17/028 | |
| 10,077,618 B2 | 9/2018 | Burgos et al. | | |
| 10,132,159 B2 | 11/2018 | Burgos | | |
| 10,197,197 B2 * | 2/2019 | Green | F17D 5/00 | |
| 10,197,212 B2 * | 2/2019 | Green | G01M 11/086 | |
| 10,472,933 B2 * | 11/2019 | Steele | E21B 41/0042 | |
| 10,520,625 B2 | 12/2019 | Walters et al. | | |
| 10,544,893 B2 * | 1/2020 | Green | F16L 59/147 | |
| 10,683,950 B2 * | 6/2020 | Green | F16L 59/14 | |
| 11,078,756 B2 | 8/2021 | Maddux et al. | | |
| 11,441,392 B2 * | 9/2022 | Fripp | E21B 41/0035 | |
| 11,506,024 B2 * | 11/2022 | Steele | E21B 47/12 | |
| 11,851,964 B2 | 12/2023 | Purkis | | |
| 2001/0012703 A1 * | 8/2001 | Wurm | E21B 17/003 | 439/32 |
| 2002/0125009 A1 * | 9/2002 | Wetzel | B25H 3/028 | 166/227 |
| 2003/0205379 A1 | 11/2003 | Steele et al. | | |
| 2003/0221829 A1 * | 12/2003 | Patel | E21B 43/10 | 166/278 |
| 2003/0221843 A1 | 12/2003 | Fipke et al. | | |
| 2004/0045705 A1 * | 3/2004 | Gardner | E21B 47/00 | 166/305.1 |
| 2005/0034873 A1 * | 2/2005 | Coon | E21B 23/08 | 166/380 |
| 2005/0121190 A1 * | 6/2005 | Oberkircher | E21B 41/0035 | 166/250.1 |
| 2006/0153508 A1 | 7/2006 | Bowker et al. | | |
| 2006/0157239 A1 * | 7/2006 | Ramos | E21B 47/135 | 166/254.2 |
| 2006/0159400 A1 * | 7/2006 | Richards | G02B 6/50 | 385/53 |
| 2006/0243454 A1 * | 11/2006 | Bolze | F16L 39/00 | 166/380 |
| 2007/0227727 A1 * | 10/2007 | Patel | E21B 17/028 | 166/278 |
| 2007/0269269 A1 * | 11/2007 | Coronado | F16L 55/38 | 405/158 |
| 2008/0110677 A1 * | 5/2008 | Hansen | E21B 23/08 | 175/85 |
| 2010/0018703 A1 | 1/2010 | Lovell et al. | | |
| 2012/0298362 A1 | 11/2012 | Steele et al. | | |
| 2012/0305267 A1 | 12/2012 | Steele | | |
| 2013/0284458 A1 | 10/2013 | Dancer et al. | | |
| 2014/0144615 A1 * | 5/2014 | Richards | E21B 17/026 | 166/376 |
| 2014/0196893 A1 | 7/2014 | Vigneaux | | |
| 2015/0292286 A1 * | 10/2015 | Rodriguez | E21B 17/028 | 166/65.1 |
| 2015/0315895 A1 * | 11/2015 | Patel | E21B 17/028 | 166/66 |
| 2015/0354302 A1 | 12/2015 | Watt et al. | | |
| 2015/0378124 A1 * | 12/2015 | Michaelis | E21B 47/002 | 385/134 |
| 2016/0153252 A1 | 6/2016 | Lajesic et al. | | |
| 2016/0161042 A1 * | 6/2016 | Green | G01M 3/165 | 138/140 |
| 2016/0251942 A1 | 9/2016 | Steele et al. | | |
| 2016/0273312 A1 | 9/2016 | Steele et al. | | |
| 2016/0341010 A1 | 11/2016 | Hepburn et al. | | |
| 2016/0341011 A1 | 11/2016 | Steele et al. | | |
| 2017/0107794 A1 * | 4/2017 | Steele | E21B 17/003 | |
| 2017/0130564 A1 | 5/2017 | Steele et al. | | |
| 2017/0227145 A1 * | 8/2017 | Green | F17D 1/08 | |
| 2018/0313156 A1 | 11/2018 | Steele et al. | | |
| 2019/0265430 A1 | 8/2019 | Nitsche et al. | | |
| 2020/0270969 A1 | 8/2020 | Steele et al. | | |
| 2021/0010349 A1 | 1/2021 | Steele | | |
| 2021/0010350 A1 | 1/2021 | Steele | | |
| 2021/0062618 A1 | 3/2021 | Steele et al. | | |
| 2021/0230978 A1 * | 7/2021 | Steele | E21B 17/0283 | |
| 2021/0310336 A1 | 10/2021 | Steele et al. | | |
| 2021/0355790 A1 * | 11/2021 | Fripp | E21B 43/14 | |
| 2021/0372274 A1 | 12/2021 | Steele et al. | | |
| 2021/0372276 A1 | 12/2021 | Steele et al. | | |
| 2022/0205341 A1 | 6/2022 | Asthana et al. | | |
| 2022/0341293 A1 | 10/2022 | Steele | | |
| 2022/0372838 A1 | 11/2022 | Toews et al. | | |
| 2023/0003119 A1 | 1/2023 | Jin et al. | | |
| 2023/0015105 A1 | 1/2023 | Loov et al. | | |
| 2025/0101817 A1 | 3/2025 | Steele et al. | | |
| 2025/0109674 A1 | 4/2025 | Donovan et al. | | |
| 2025/0137356 A1 | 5/2025 | Hepburn et al. | | |

FOREIGN PATENT DOCUMENTS

| | | | | |
|---|---|---|---|---|
| DE | 4107321 A1 * | 9/1992 | | H02G 1/08 |
| GB | 2398806 A * | 9/2004 | | E21B 47/07 |
| WO | 2004076802 A1 | 9/2004 | | |
| WO | WO-2007136380 A1 * | 12/2007 | | F16L 55/26 |
| WO | 2020176352 A1 | 9/2020 | | |

OTHER PUBLICATIONS

TCO. "Chemical Injection Valve Technology Utilized in Combination with Fiber Deployment in Harsh Well Conditions." TCO Company Website, https://www.tcogroup.com/case-studies/chemical-injection-valve-technology-utilized-in-combination-with-fiber-deployment-in-harsh-well-conditions-article439-72.html. Accessed Jul. 31, 2025.

PDSConnect YouTube Video. "PDS Blowing Fiber." Uploaded Apr. 21, 2021 YouTube Website, https://www.youtube.com/watch?v=ubwa5b4y9NA&t=191s. Accessed Jul. 31, 2025.

(56)  References Cited

OTHER PUBLICATIONS

Halliburton. "Real-Time Analytics Fiber-Optic Fracture Monitoring." Halliburton Data Sheet, 2020. H011884. PDF file. 8 pages.

Halliburton. "ExpressFiber Disposable Fiber Cable Low-Cost Fiber for Routine Cross-Well Monitoring." Halliburton Data Sheet, 2021. PDF file. 2 pages.

Baker Hughes. "Electric intelligent completion, fiber optic monitoring for water injector well a world first." Baker Hughes Data Sheet, 2020. 82162 Rev. Oct. 2021. PDF file. 2 pages.

Sun, Yankun et al. "Distributed Fiber Optic Sensing System for Well-Based Monitoring Water Injection Tests—A Geomechanical Responses Perspective." Water Resources Research Journal, vol. 56, Issue No. 1, Jan. 2020, pp. 1-19. PDF file. 19 pages.

Schlumberger. "Optiq Seismic fiber-optic borehole seismic solution—Significantly improves the efficiency of borehole seismic acquisitions while lowering the cost and environmental impact." Schlumberger Data Sheet, 2021. 21-RPEV-798494. PDF file. 3 pages.

Schlumberger. "Optiq Fiber-optic solutions." Schlumberger Company Website, https://www.slb.com/products-and-services/innovating-in-oil-and-gas/reservoir-characterization/surface-and-downhole-logging/optiq-schlumberger-fiber-optic-solutions. Accessed Jul. 31, 2025.

Schlumberger. "OpenPath Reach—Extended-contact stimulation service." Schlumberger Data Sheet, 2017. 17-ST-345204. PDF file. 1 page.

Schlumberger. "Kinetix RT—Real-time stimulation optimization software." Schlumberger Data Sheet, 2018. 17-ST-319837. PDF file. 1 page.

Schlumberger. "WellWatcher Flux—Multizonal reservoir monitoring system." Schlumberger Data Sheet, 2016. 16-CO-166422. PDF file. 2 pages.

Schlumberger. "WellWatcher BriteBlue HT—High-temperature multimode DT fiber." Schlumberger Data Sheet, 2014. 13-CO-0050. PDF file. 2 pages.

Schlumberger. "WellWatcher Neon—DTS, DAS, and PT gauge system." Schlumberger Data Sheet, 2016. 15-CO-13321. PDF file. 2 pages.

Sadigov, Teymur, et al. "Real-Time Water Injection Monitoring with Distributed Fiber Optics UsingPhysics-Informed Machine Learning." Offshore Technology Conference OTC-30982-MS paper prepared for the 2021 Offshore. Technology Conference, Aug. 2021, pp. 1-13. PDF file. 13 pages.

International Search Report and Written Opinion for International Patent Application No. PCT/US2025/018328 dated Oct. 30, 2025. PDF file. 12 pages.

* cited by examiner

PUMP DOWN FIBER SYSTEM, METHOD AND TOOLS FOR MULTILATERAL WELLS

BACKGROUND

After drilling a wellbore in a subterranean formation for recovering hydrocarbons such as oil and gas lying beneath the surface, downhole completion assemblies (e.g., a lower main bore completion assembly, a lateral completion assembly, etc.) may be installed within the wellbore to receive hydrocarbons produced from corresponding production zones. For example, the lateral completion assembly may be configured to receive hydrocarbons produced from a lateral bore of the multilateral well. The downhole completion assemblies may include corresponding downhole devices such as control valves, temperature sensors, pressure sensors, etc., which may be used to monitor downhole conditions and adjust flow rate or other parameters in response to predetermined downhole conditions. Traditionally, communication systems such as electrical wiring, mud pulse telemetry, etc. may be used to communicate between the surface and the various downhole devices. However, providing faster and more reliable communication between the surface and the various downhole devices may improve efficiency and reduce costs for completion operations.

BRIEF DESCRIPTION OF THE DRAWINGS

These drawings illustrate certain aspects of some of the embodiments of the present disclosure and should not be used to limit or define the method.

DETAILED DESCRIPTION

Disclosed herein are systems and methods for providing communication between the surface and at least one downhole device (e.g., a control valve, a temperature sensor, a pressure sensor, etc.) and, more particularly, example embodiments may include pump down fiber system that is configured to run at least fiber optic line into a wellbore. In particular, the pump down fiber system may include a plurality of conduits configured to form at least one fiber channel extending into various portions of the wellbore. For example, the plurality of conduits may provide fiber channels extending into the main bore, as well as into lateral bores. The fiber channels may be configured to receive and guide at least one fiber optic line being run-in-hole from the surface. The at least one fiber optic line may be secured to a corresponding plug configured to move along the at least one fiber channel in response to pressure in the at least one fiber channel, such that the at least one fiber optic line may be pumped downhole to a desired position in the wellbore for transmitting communication between the surface and the at least one downhole device. Additionally, or alternatively, the at least one fiber optic line may be configured for distributed optical fiber sensing between the surface and the desired position in the wellbore. Moreover, as set forth in greater detail below, the pump down fiber system may further include diverter assemblies configured to guide the at least one fiber optic line between multiple potential paths as the at least one fiber optic line is pumped downhole.

Figure 1:
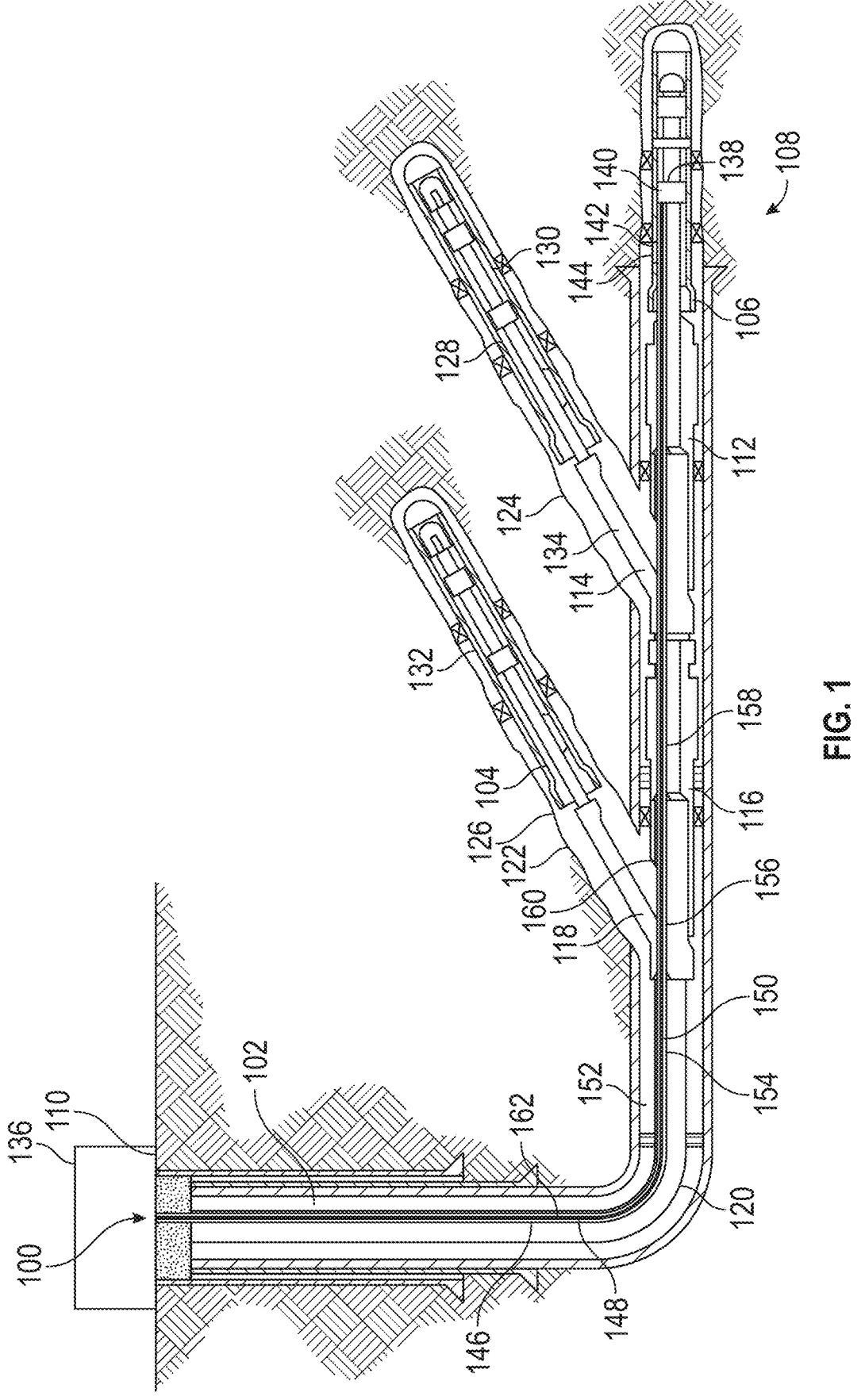
FIG. 1 illustrates an elevation view of a pump down fiber system, in accordance with some embodiments of the present disclosure.

FIG. 1 illustrates an elevation view of a pump down fiber system, in accordance with some embodiments of the present disclosure. The pump down fiber system 100 (e.g. downhole system) may be disposed within a wellbore 102 during completion operations. Various downhole completion assemblies 104 may be disposed within the wellbore to provide a fluid path for hydrocarbons during production. For example, a lower main bore completion assembly 106 may be configured to receive hydrocarbons produced from a lower main bore completion zone 108. The hydrocarbons may flow uphole from the lower main bore completion assembly 106 toward the surface 110 via a fluid path provided by downhole completion assemblies 104 such as a lower deflector assembly 112, a lower junction assembly 114, an upper deflector assembly 116, an upper junction assembly 118, an upper production tubular 120, etc. Further, hydrocarbons produced in lateral bore 122 (e.g., a lower lateral bore 124, an upper lateral bore 126, etc.) may be received via a corresponding lateral completion assembly 128 (e.g., a lower lateral completion assembly 130, an upper lateral completion assembly 132, etc.) and directed in an uphole direction toward a corresponding junction assembly 134 (e.g., the lower junction assembly 114, the upper junction assembly 118, etc.) such that the hydrocarbons may flow up toward the surface 110.

The pump down fiber system 100 may be disposed within the wellbore 102 during completion operations to provide communication between various portions of the wellbore 102 and surface operations 136. The various downhole completion assemblies 104 may include downhole devices 138 (e.g., control valves 140, pressure transducers 142, temperature sensors 144, etc.), which may be configured to communicate with the surface operations 136. For example, measurements provided by the pressure transducers 142 and the temperature sensors 144 may be output to the surface operations 136 for monitoring. In response to the temperature and/or pressure crossing threshold values, instructions may be sent from the surface operations 136 to the control valves 140 to adjust the control valves 140. As set forth in greater detail below, the pump down fiber system 100 is configured to provide communication between the downhole devices 138 and the surface 110.

The pump down fiber system 100 may include a plurality of conduits 146 configured to interconnect to form at least one fiber channel 148 extending along a portion of the wellbore 102. For example, as illustrated, the plurality of conduits 146 may interconnect to form a first fiber channel 150 extending along a main bore 152 of the wellbore 102 toward the lower main bore completion assembly 106. However, the plurality of conduits 146 may be interconnected to form the at least one fiber channel 148 extending to any suitable location within the wellbore 102. Further, the plurality of conduits 146 may be interconnected to form a plurality of fiber channels 148 extending to various portions of the wellbore 102. Additionally, the at least one fiber channel 148 may be configured for a fiber optic line or any other suitable type of communication line. As such, the plurality of conduits 146 may include any suitable types of energy transfer cables, devices, sensors, structural components, barriers, as well as other devices for supporting a corresponding communication line.

Moreover, the plurality of conduits 146 may be secured to and/or formed within the downhole completion assemblies 104. For example, the plurality of conduits 146 may include a first conduit 154 secured to the upper production tubular 120, a second conduit 156 secured to the upper junction assembly 118, a third conduit 158 secured to the upper deflector assembly 116, etc. As such, the plurality of conduits 146 may be run-in-hole with the various downhole completion assemblies 104 during installation of the various downhole completion assemblies 104. As set forth in greater detail below, the plurality of conduits 146 may be configured to interconnect. For example, the upper production tubular 120 may be run-in-hole after installation of the upper junction assembly 118. The upper production tubular 120 and/or the upper junction assembly 118 may include an orientation device 160 (e.g., mule shoe, etc.) configured to orient the upper production tubular 120 with the upper junction assembly 118 such that the first conduit 154 secured to the upper production tubular 120 is aligned with the second conduit 156 secured to the upper junction assembly 118. As the upper production tubular 120 engages the upper junction assembly 118, the first conduit 154 may be configured to connect with the second conduit 156 to form at least a portion of the at least one fiber channel 148. Moreover, the pump down fiber system 100 may further include at least one fiber optic line 162 configured to extend through at least a portion of the at least one fiber channel 148. In particular, the at least one fiber optic line 162 is configured to be run in hole, through the at least one fiber channel 148, to a predetermined downhole position such that the at least one fiber optic line 162 may extend from a surface position to a downhole position. The downhole position may correspond to the downhole device 138 (e.g., the control valve 140, the pressure transducer 142, the temperature sensor 144, etc.) The at least one fiber optic line 162 may be configured to connect to the downhole device 138 at the downhole position such that the at least one fiber optic line 162 may transmit signals between the downhole position and the surface position to carry information between the downhole device 138 and the surface operations 136.

Alternatively, or additionally, the at least fiber optic line 162 may be configured for distributed fiber optic sensing between the surface position and the downhole position. That is, the at least fiber optic line 162 may include optical fiber sensors positioned along the at least one fiber optic line 162. Moreover, the downhole position may correspond to a downhole end of the at least one fiber optic line 162. The at least one fiber optic line 162 may be configured for distributed temperature sensing, distributed acoustic sensing, and/or any suitable type of distributed fiber optic sensing. For example, the at least one fiber optic line 162 may be configured to detect temperatures in the wellbore 102 along the fiber optic line 162 such that temperature data along the wellbore 102 (e.g., between the surface position and the downhole position) may be provided to the surface 110.

Figure 2:
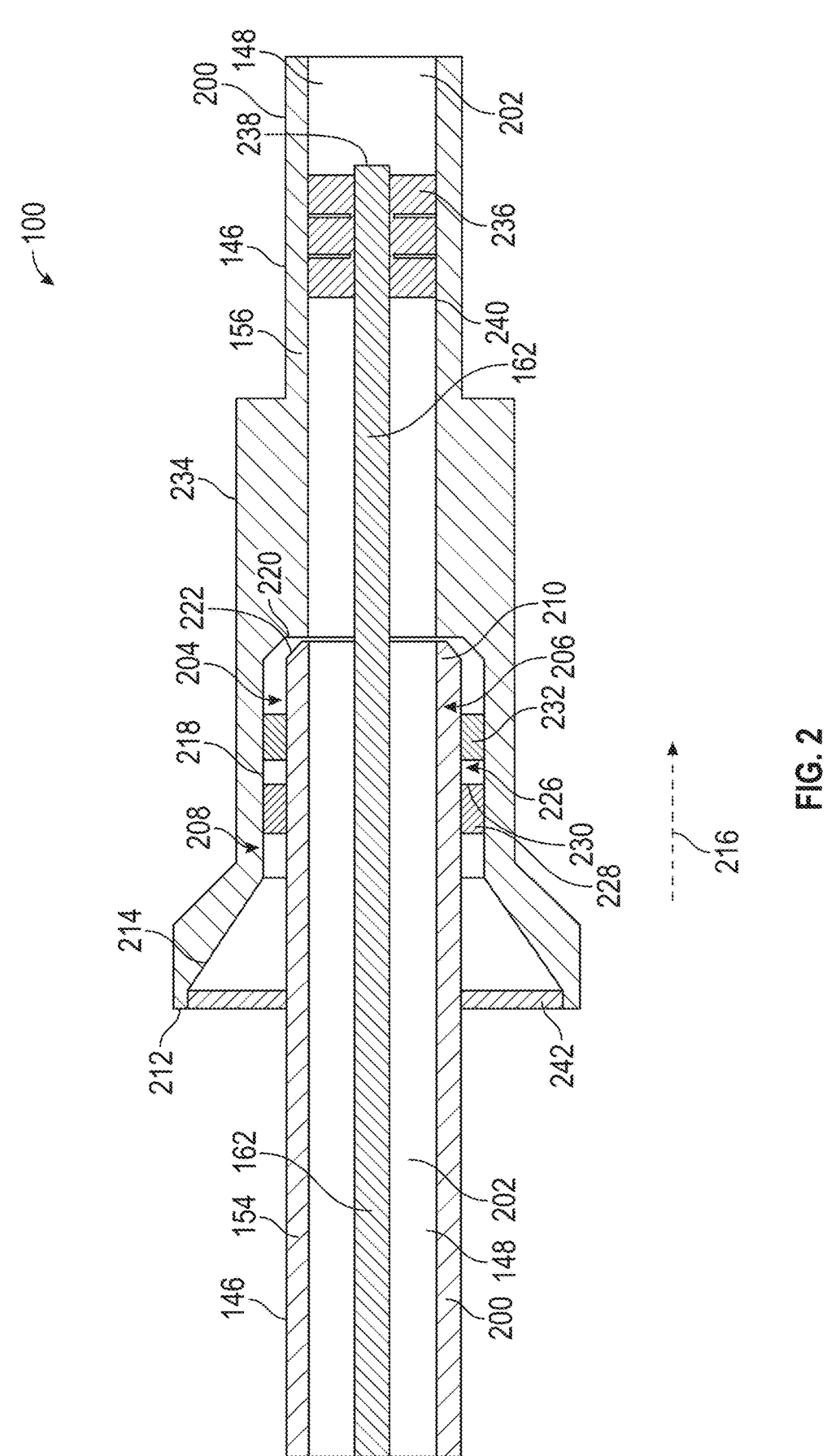
FIG. 2 illustrates a cross-sectional view of a first conduit of the pump down fiber system interconnected with a second conduit via a stab-in connection, in accordance with some embodiments of the present disclosure.

FIG. 2 illustrates a cross-sectional view of a first conduit of the pump down fiber system interconnected with a second conduit via a stab-in connection, in accordance with some embodiments of the present disclosure. As set forth above, the pump down fiber system 100 includes the plurality of conduits 146 each having a respective tubular body portion 200 and a respective central bore 202 forming at least a portion of the at least one fiber channel 148. Further, the plurality of conduits 146 may be configured to interconnect to form the at least one fiber channel 148 extending along a portion of the wellbore 102. In particular, the plurality of conduits 146 may be configured to interconnect via a stab-in connection 204. The plurality of conduits 146 may be secured to or formed in various downhole assemblies (e.g., the lower deflector assembly 112, the lower junction assembly 114, the upper deflector assembly 116, the upper junction assembly 118, the upper production tubular 120, the lower lateral completion assembly 130, the upper lateral completion assembly 132, etc.), such that the plurality of conduits 146 may be configured to interconnect during installation of the various downhole assemblies.

Moreover, the stab-in connection 204 may be formed via a stab-in connector 206 interfacing with a corresponding stab-in receptacle 208. Each conduit of the plurality of conduits 146 may include a stab-in connector 206 formed at a first end 210 (e.g., a downhole end) of the respective conduit 146 and a stab-in receptacle 208 formed at a second end 212 (e.g., an uphole end) of the respective conduit 146. For example, as illustrated, the plurality of conduits 146 may include a first conduit 154 having a stab-in connector 206 formed at the first end 210 of the first conduit 154 and a second conduit 156 having a stab-in receptacle 208 formed at a second end 212 of the second conduit 156.

Moreover, the stab-in receptacle 208 may include a tapered inner guiding surface 214 formed at the second end 212. The tapered inner guiding surface 214 may be tapered along the axis of the respective conduit such that the radius of the tapered inner guiding surface 214 is reduced in the downhole direction 216. A radially inner sealing surface 218 may extend axially from a downhole end of the tapered inner guiding surface 214 to a shoulder portion 220 of the stab-in receptacle 208. Moreover, the corresponding stab-in connector 206 may include a tapered portion 222 configured to interface with the tapered inner guiding surface 214 of the stab-in receptacle 208. In particular, the tapered portion 222 of the stab-in connector may be configured to interface with the tapered inner guiding surface 214 in response to the stab-in connector 206 moving into contact with the stab-in receptacle 208 during installation. The tapered shape of the tapered inner guiding surface 214 may be configured to funnel the stab-in connector 206 into alignment with the stab-in receptacle 208 such that the stab-in connector 206 may move into the radially inner sealing surface 218 and approach the shoulder portion 220 of the stab-in receptacle 208.

The stab-in connector 206 may include a connection seal assembly 226 disposed about the stab-in connector 206. The connection seal assembly 226 may include at least one connection seal 228 configured to interface with an inner surface of the corresponding stab-in receptacle 208 (e.g., the radially inner sealing surface 218) to seal the stab-in connector 206 against the corresponding stab-in receptacle 208. As illustrated, the connection seal assembly 226 may include a first seal 230 and a second seal 232 each disposed about the stab-in connector 206. However, the connection seal assembly 226 may include any suitable number of seals and any suitable types of seals. The connection seal assembly 226 may be configured to seal the stab-in connector 206 against the stab-in receptacle 208 to isolate the at least one fiber channel 148, formed via the plurality of conduits 146, from an annulus 234 of the wellbore 102.

Moreover, the at least one fiber optic line 162 is configured to extend through at least a portion of the at least one fiber channel 148. As illustrated, the at least one fiber optic line 162 may extend through the first conduit 154 and into the second conduit 156. As set forth above, the at least one fiber optic line 162 may be run-in-hole through the at least one fiber channel 148 formed with the plurality of conduits 146. The pump down fiber system 100 may include a plug 236 secured to leading end 238 of the at least one fiber optic line 162 to help move the at least one fiber optic line 162 along the at least one fiber channel 148. The plug 236 may have a greater diameter than the at least one fiber optic line 162 and may be configured to seal against a radially inner surface 240 of the at least one fiber channel 148. The plug 236 is configured to move along the at least one fiber channel 148 in response to fluid pressure in the at least one fiber channel 148 to drive the leading end 238 of the at least one fiber optic line 162 along the at least one fiber channel 148 from the surface position to at least the downhole position.

The first conduit 154 and the second conduit 156 may each include at least one barrier feature 242 to prevent fluid and/or debris in the wellbore 102 from entering the interior portions of the first conduit 154 and the second conduit 156 before, during, and/or after connection of the first conduit 154 and the second conduit 156. The at least one barrier feature 242 may include a seal, a debris wiper, a cap, a movable cap, a wet mate, a pressure compensation device, a container with flushing/cleaning fluid or material for cleaning, flushing, and/or wash the interior portions of the first conduit and the second conduit, or some combination thereof.

Figure 3:
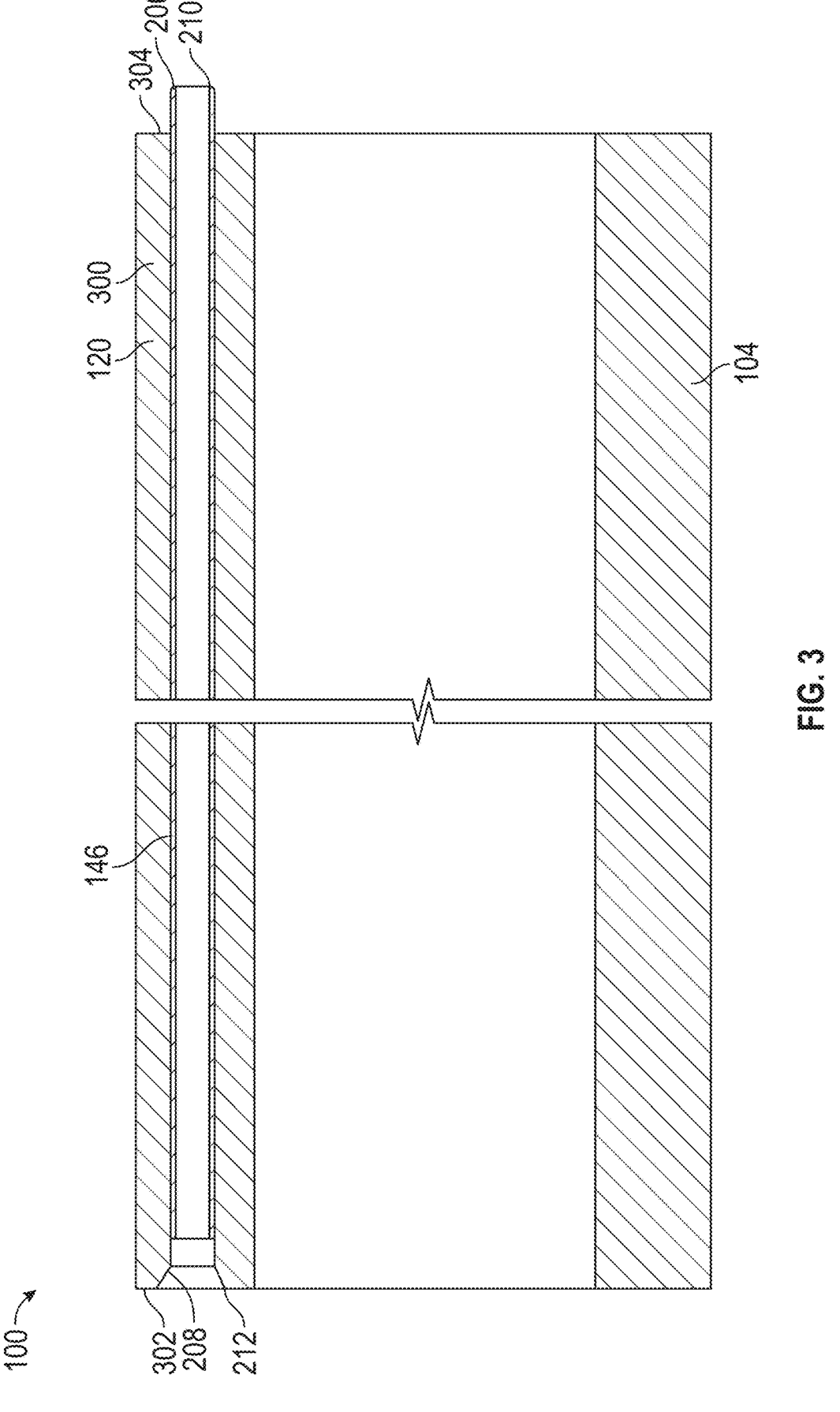
FIG. 3 illustrates a cross-sectional view of a conduit of the pump down fiber system extending through a body portion of a downhole completion system, in accordance with some embodiments of the present disclosure.

FIG. 3 illustrates a cross-sectional view of a conduit of the pump down fiber system extending through a body portion of a downhole completion system, in accordance with some embodiments of the present disclosure. As set forth above, the pump down fiber system 100 may include at least one downhole completion assembly 104 (e.g., the upper production tubular 120). As illustrated, the at least one downhole completion assembly 104 includes a body portion 300. Moreover, the at least one conduit 146 of the plurality of conduits may be formed within the body portion 300. That is, the at least one conduit 146 of the plurality of conduits may be integral to the at least one downhole completion assembly 104. The at least one conduit 146 may extend through the body portion 300 from an upper end 302 of the downhole completion assembly 104 to a lower end 304 of the downhole completion assembly 104.

Further, the first end 210 of the at least one conduit 146 may be formed proximate the lower end 304 of the downhole completion assembly 104 such that respective stab-in connector 206 may extend axially downhole from the lower end 304 of the downhole completion assembly 104 for connecting to a corresponding stab-in receptacle 208 of an adjacent downhole completion assembly 104. Similarly, the second end 212 of the at least one conduit 146 may be formed proximate the upper end 302 of the downhole completion assembly 104 such that the respective stab-in receptacle 208 may be configured to receive a corresponding stab-in connector 206 of an adjacent downhole completion assembly 104.

Figure 4:
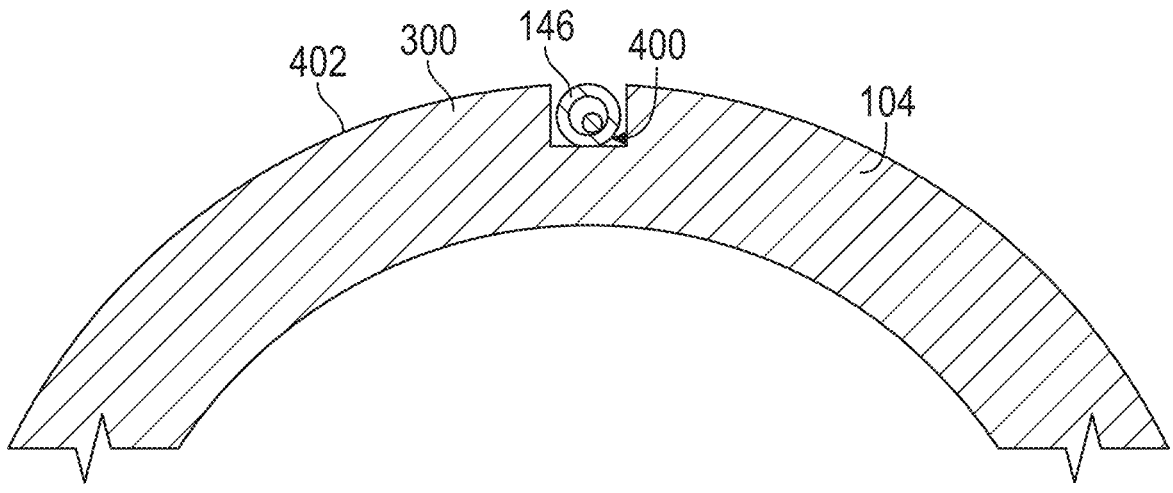
FIG. 4 illustrates a cross-sectional view of a conduit of the pump down fiber system extending through a slot formed in an outer surface of a body portion of a downhole completion system, in accordance with some embodiments of the present disclosure.

FIG. 4 illustrates a cross-sectional view of a conduit of the pump down fiber system extending through a slot formed in an outer surface of a body portion of a downhole completion system, in accordance with some embodiments of the present disclosure. As illustrated, the at least one downhole completion assembly 104 may include at least one slot 400 formed in a radially outer surface 402 of the body portion 300 of the downhole completion assembly 104. The at least one slot 400 may extend from an upper end 302 of the downhole completion assembly 104 to a lower end 304 of the downhole completion assembly 104 (shown in FIG. 3). Further, the at least one slot 400 may be configured to receive the at least one conduit 146 of the plurality of conduits. That is the at least one conduit 146 may be disposed within the at least one slot 400. Having the at least one conduit 146 disposed within the at least one slot 400 may protect the at least one conduit 146 during insertion of the at least one conduit 146 into the wellbore 102 (shown in FIG. 1).

Figure 5:
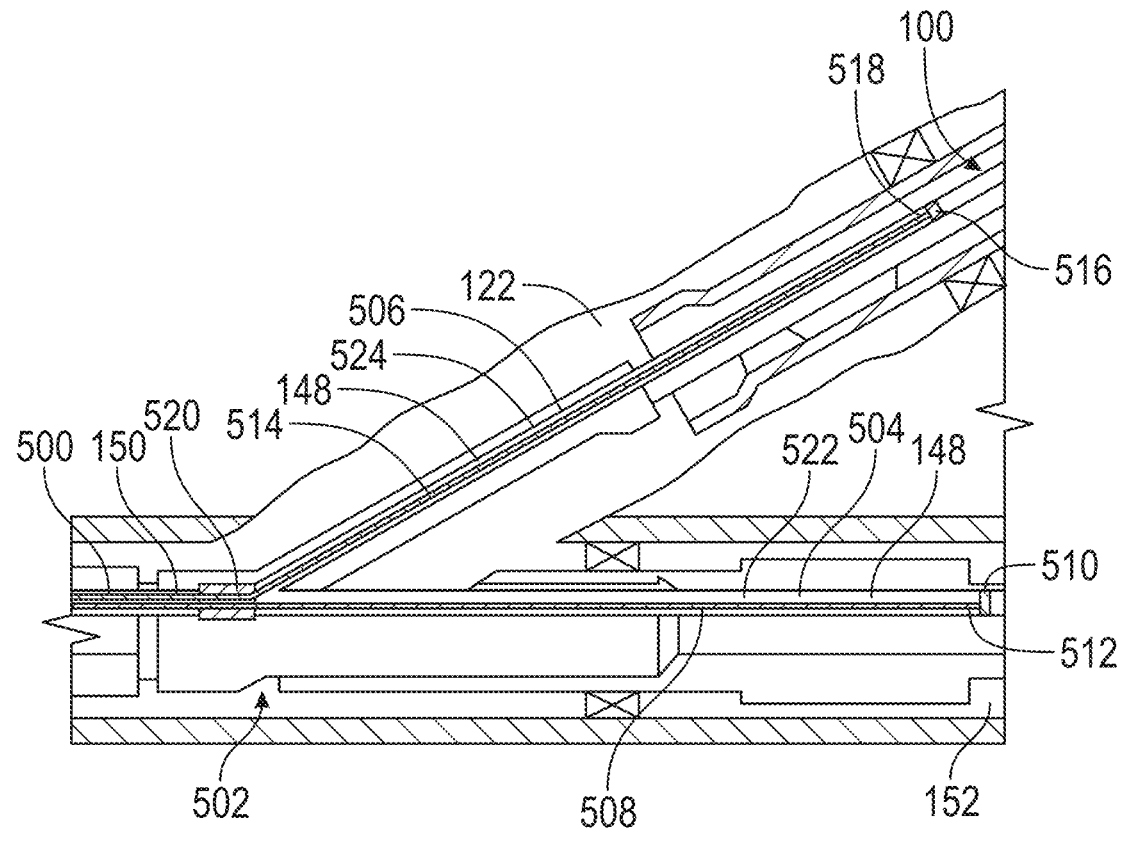
FIG. 5 illustrates an elevation view of a pump down fiber system having fiber channels extending from a junction into a lower main bore portion and a lower lateral bore portion of a multilateral well, in accordance with some embodiments of the present disclosure.

FIG. 5 illustrates an elevation view of a pump down fiber system having fiber channels extending from a junction into a lower main bore portion and a lower lateral bore portion of a multilateral well, in accordance with some embodiments of the present disclosure. Indeed, the pump down fiber system 100 may include a plurality of fiber channels 148 formed via the plurality of interconnected conduits 146. For example, as illustrated, the plurality of fiber channels 148 may include an upper fiber channel 500 extending uphole from a wellbore junction 502, a lower main fiber channel 504 extending downhole from the wellbore junction 502 into the main bore 152, and a lower lateral fiber channel 506 extending downhole from the wellbore junction 502 into the lateral bore 122.

Moreover, a first fiber optic line 508 may be configured to extend through the upper fiber channel 500 and into the lower main fiber channel 504 to a first downhole position to transmit signals between the first downhole position and a surface position. A first plug 510 may be secured to a first leading end 512 of the first fiber optic line 508 to help move the first fiber optic line 508 along the upper fiber channel 500 and into the lower main fiber channel 504 in response to pressure in the upper fiber channel 500 and/or the lower main fiber channel 504. Further, a second fiber optic line 514 may be configured to extend through the upper fiber channel 500 and into the lower lateral fiber channel 506 to a second downhole position to transmit signals between the second downhole position and the surface position. A second plug 516 may be secured to a second leading end 518 of the second fiber optic line 514 to help move the second fiber optic line 514 along the upper fiber channel 500 and into the lower lateral fiber channel 506 in response to pressure in the upper fiber channel 500 and/or the lower lateral fiber channel 506.

The pump down fiber system 100 may include a diverter assembly 520 to help direct the first fiber optic line 508 and the second fiber optic line 514 into their respective channels during insertion. Generally, the diverter assembly 520 may be disposed between a first fiber channel 150, a second fiber channel 522, and a third fiber channel 524 of the at least one fiber channel 148. The diverter assembly 520 is configured to selectively connect the first fiber channel 150 to the second fiber channel 522 in a first state and connect the first fiber channel 150 to the third fiber channel 524 in a second state. For example, as illustrated, the diverter assembly 520 may be disposed at a junction between the upper fiber channel 500, the lower main fiber channel 504, and the lower lateral fiber channel 506. The diverter assembly 520 is configured to selectively direct the first plug 510 and the corresponding first fiber optic line 508 to move from the upper fiber channel 500 into the lower main fiber channel 504 in a first state and direct the second plug 516 and the corresponding second fiber optic line 514 to move from the upper fiber channel 500 into the lower lateral fiber channel 506 in a second state.

Figure 6B:
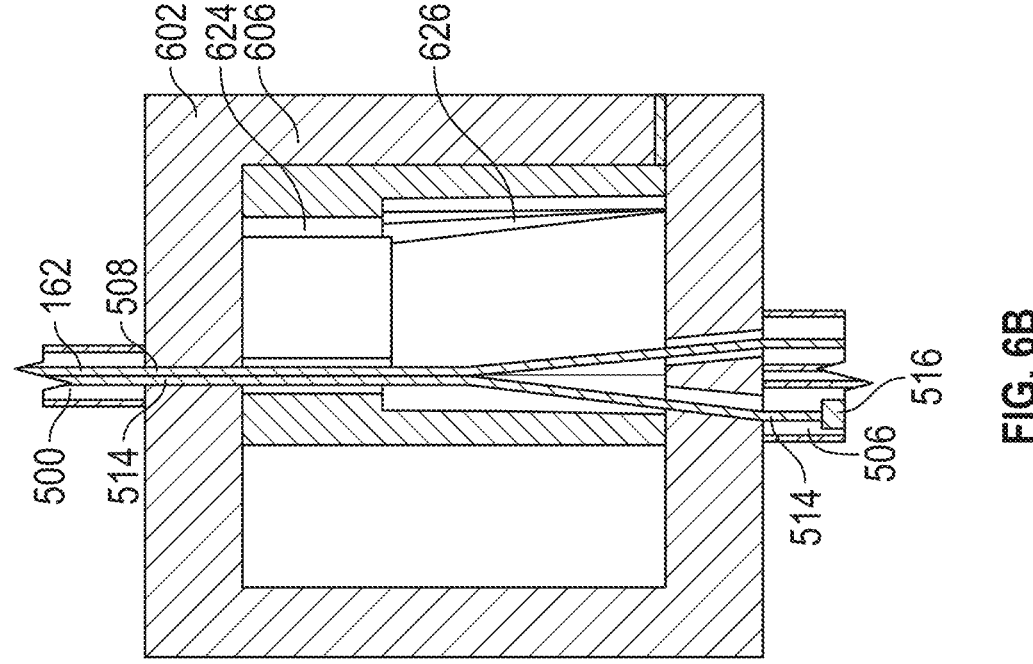
FIGS. 6A-B illustrate cross-sectional views of a diverter assembly that includes a shuttle valve in a first state and a second state, respectively, in accordance with some embodiments of the present disclosure.
Figure 6A:
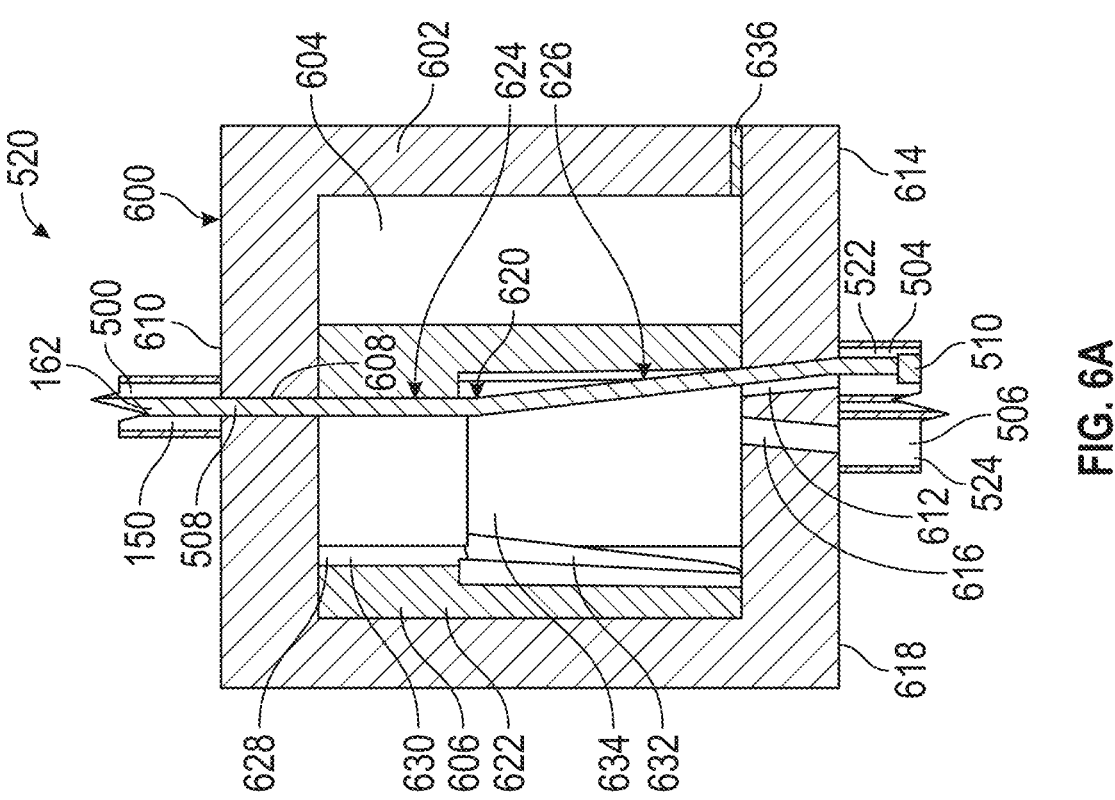

FIGS. 6A-B illustrate cross-sectional views of a diverter assembly that includes a shuttle valve in a first state and a second state, respectively, in accordance with some embodiments of the present disclosure. Indeed, the diverter assembly 520 may include a shuttle valve 600 configured to selectively connect the first fiber channel 150 to the second fiber channel 522 in the first state and connect the first fiber channel 150 to the third fiber channel 524 in the second state. For example, the shuttle valve 600 may be disposed at a junction between the upper fiber channel 500, the lower main fiber channel 504, and the lower lateral fiber channel 506. As such, the diverter assembly 520 (e.g., the shuttle valve 600) may be configured to selectively direct the first plug 510 and the corresponding first fiber optic line 508 to move from the upper fiber channel 500 into the lower main fiber channel 504 in a first shuttle valve position (e.g., the first state). Alternatively, the diverter assembly 520 (e.g., the shuttle valve 600) may be configured to selectively direct the first plug 510 and the corresponding first fiber optic line 508 to move from the upper fiber channel 500 into the lower lateral fiber channel 506 in a second shuttle valve position (e.g., the second state).

Further, as another example, the diverter assembly 520 (e.g., the shuttle valve 600) may be configured to selectively direct the first plug 510 and the corresponding first fiber optic line 508 to move from the upper fiber channel 500 into the lower main fiber channel 504 in the first shuttle valve position (e.g., the first state) and direct the second plug 516 and the corresponding second fiber optic line 514 to move from the upper fiber channel 500 into the lower lateral fiber channel 506 in the second shuttle valve position (e.g., the second state). FIG. 6A shows the diverter assembly disposed in the first shuttle valve position (e.g., the first state).

The shuttle valve 600 (e.g. the diverter assembly 520) may be formed within the junction assembly 134 (shown in FIG. 1). As such, a housing portion 602 of the shuttle valve 600 may be disposed within the junction assembly 134. That is, the housing portion 602 of the shuttle valve 600 may be integral to the junction assembly 134. Alternatively, the diverter assembly 520 may be separate from the junction assembly 134 such that the housing portion 602 may be disposed in the annulus 234 (shown in FIG. 2) of the wellbore junction 502 proximate the junction assembly 134. The housing portion 602 may be secured to an outer surface 110 of the junction assembly 134.

The shuttle valve 600 may include a valve cavity 604 formed within the housing portion 602. As set forth in greater detail below, the valve cavity 604 is configured to house a shifting block 606, which is configured to actuate between the first shuttle valve position (e.g., the first state) and the second shuttle valve position (e.g., the second state). Moreover, the shuttle valve 600 may include an upper bore 608 extending from an upper connection end 610 of the housing portion 602 to the valve cavity 604. The upper connection end 610 is configured to connect with the upper fiber channel 500. That is, the upper connection end 610 may be secured to the upper fiber channel 500 such that the at least one fiber optic line 162 may enter the shuttle valve 600 via the upper connection end 610.

The shuttle valve 600 may also include a first lower bore 612 extending from the valve cavity 604 to a first lower connection end 614 of the housing portion 602. The first lower connection end 614 is configured to connect with the lower main fiber channel 504. That is, the first lower connection end 614 may be secured to the lower main fiber channel 504 such that the at least one fiber optic line 162 may exit the shuttle valve 600 via the first lower bore 612 to pass into the lower main fiber channel 504.

Further, the shuttle valve 600 may include a second lower bore 616 extending from the valve cavity 604 to a second lower connection end 618 of the housing portion 602. The second lower connection end 618 is configured to connect with the lower lateral fiber channel 506. That is, the second lower connection end 618 may be secured to the lower lateral fiber channel 506 such that the at least one fiber optic line 162 may exit the shuttle valve 600 via the second lower bore 616 to pass into the lower lateral fiber channel 506.

Moreover, as set forth above, the shuttle valve 600 may include the shifting block 606 disposed within the valve cavity 604. As illustrated, the shifting block 606 includes a first channel 620 configured to connect the upper bore 608 with the first lower bore 612 in a first shuttle valve position. As illustrated, the first channel 620 may be formed in an outer surface 622 of the shifting block 606. Alternatively, the first channel 620 may extend through the shifting block 606. Further, the first channel 620 may include a first linear portion 624 and a first angled portion 626. The first linear portion 624 may be aligned with the upper bore 608 in the first shuttle valve position. The first angled portion 626 may extend from the first linear portion 624 toward the first lower bore 612. However, the first channel 620 may include any suitable channel configured to connect the upper bore 608 with the first lower bore 612 in the first shuttle position such that the at least one fiber optic line 162 being run-in-hole to the shuttle valve 600 in the first shuttle valve position may be directed to move from the shuttle valve 600 into the lower main fiber channel 504.

Further, the shifting block 606 includes a second channel 628 configured to connect the upper bore 608 with the second lower bore 616 in a second shuttle valve position. As illustrated, the second channel 628 may also be formed in the outer surface 622 of the shifting block 606. Further, the second channel 628 may include a second linear portion 630 and a second angled portion 632. The second linear portion 630 may be aligned with the upper bore 608 in the second shuttle valve position. The second angled portion 632 may extend from the second linear portion 630 toward the second lower bore 616. However, the second channel 628 may include any suitable channel configured to connect the upper bore 608 with the second lower bore 616 in the second shuttle position such that the at least one fiber optic line 162 being run-in-hole to the shuttle valve 600 in the second shuttle valve position may be directed to move from the shuttle valve 600 into the lower lateral fiber channel 506. FIG. 6B shows the shuttle valve 600 in the second shuttle valve position.

Additionally, a transition channel 634 may be formed in the shifting block 606 between the first channel 620 and the second channel 628. Respective depths of the first channel 620 and the second channel 628 may be greater than the transition channel 634 such that the first channel 620 and the second channel 628 may be configured to guide the corresponding first fiber optic line 508 and the second fiber optic line 514 into the first lower bore 612 and the second lower bore 616, respectively. The transition channel 634 may include a depth greater than a diameter of the at least one fiber optic line 162 (e.g., the first fiber optic line 508, the second fiber optic line 514, etc.) such that the transition channel 634 provides sufficient clearance for the at least one fiber optic line 162. Further, the transition channel 634 may extend between the first channel 620 and the second channel 628.

For example, the first fiber optic line 508 may be inserted with the shuttle valve 600 in the first shuttle valve position (e.g., the first channel 620 aligned with the upper bore 608 and the first lower bore 612). After the first fiber optic line 508 passes through the first channel 620 and into the lower main fiber channel 504, the shuttle valve 600, as illustrated, may be actuated to the second shuttle valve position. As the shifting block 606 moves, the first fiber optic line 508 may exit the first channel 620 laterally and move into the transition channel 634 in response to movement of the first channel 620 with respect to the first fiber optic line 508 such that the first fiber optic line 508 may remain substantially in place. With the shuttle valve 600 in the second shuttle valve position (e.g., the second channel 628 aligned with the upper bore 608 and the second lower bore 616), the second fiber optic line 514 may be run-in-hole through the upper fiber channel 500 alongside the first fiber optic line 508. However, as the second fiber optic line 514 enters the shuttle valve 600, the second fiber optic line 514 may be guided by the second channel 628 to divert from the path of the first fiber optic line 508 and move into the lower lateral fiber channel 506 via the second lower bore 616.

The shifting block 606 may be configured to actuate between the first shuttle valve position and the second shuttle valve position in response to pressure applied through the upper fiber channel 500, pressure applied through a hydraulic line 636 connected to the valve cavity 604 of the shuttle valve 600, actuation via an electric motor (not shown), or some combination thereof. To actuate the shuttle valve 600 via pressure applied through the upper fiber channel 500, the shuttle valve 600 may be configured actuate to the first shuttle valve position in response to holding pressure in the upper fiber channel 500 at a first predetermined pressure for a first duration. Further, the shuttle valve 600 may be configured actuate to the second shuttle valve position in response to holding pressure in the upper fiber channel 500 at a second predetermined pressure for a second duration. For example, pressure in the upper fiber channel 500 may be held at 5000 psi for five minutes to actuate the shuttle valve 600 to the first shuttle valve position, and pressure in the upper fiber channel 500 may be held at 3000 psi for ten minutes to actuate the shuttle valve 600 to the second shuttle valve position. However, the shuttle valve 600 may be configured to shift between the first shuttle valve position and the second shuttle valve position in response to any suitable combination of pressures and durations.

Figures 7A, 7B:
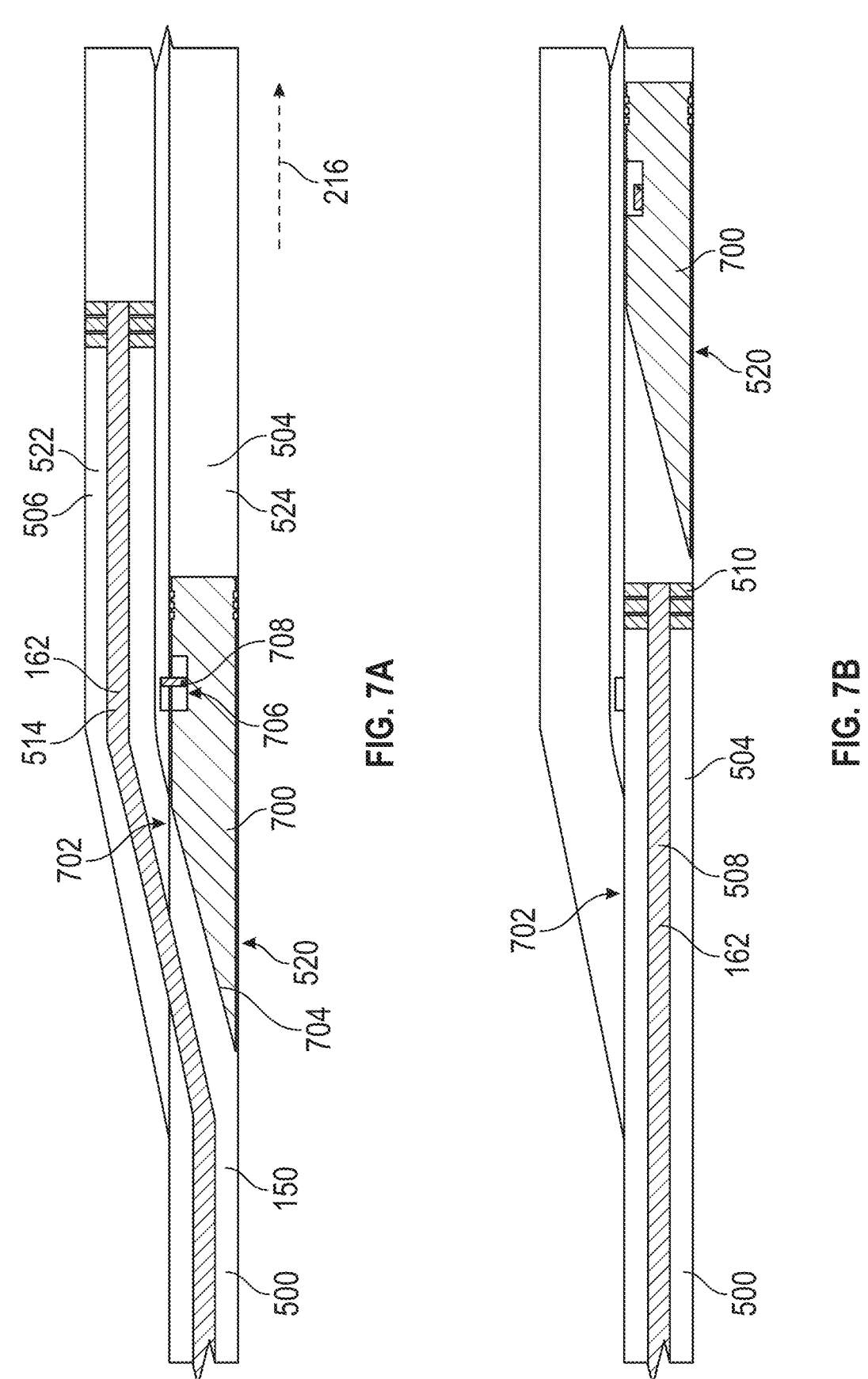
FIGS. 7A-B illustrate cross-sectional views of a diverter assembly that includes a plug deflector in a first state and a second state, respectively, in accordance with some embodiments of the present disclosure.

FIGS. 7A-B illustrate cross-sectional views of a diverter assembly that includes a plug deflector in a first state and a second state, respectively, in accordance with some embodiments of the present disclosure. Indeed, as illustrated in FIG. 7A, the diverter assembly 520 may include a plug deflector 700 configured to deflect the second fiber optic line 514 into the second fiber channel 522 (e.g., the lower lateral fiber channel 506) in the second state. For example, the first fiber channel 150 (e.g., the upper fiber channel 500), the second fiber channel 522 (e.g., the lower lateral fiber channel 506), and the third fiber channel 524 (e.g., the lower main fiber channel 504) may be connected at a fiber channel junction 702. Further, as illustrated, the upper fiber channel 500 may be axially aligned with the lower main fiber channel 504 and the lower lateral fiber channel 506 may angularly offset from the lower main fiber channel 504 such that the at least one fiber optic line 162 may be directed into the lower main fiber channel 504 from the upper fiber channel 500 based on the alignment of the upper fiber channel 500 with the lower main fiber channel 504. However, in the second state, the plug deflector 700 may be disposed at least partially within the fiber channel junction 702 to deflect the at least one fiber optic line 162 (e.g. the second fiber optic line 514) into the lower lateral fiber channel 506. In particular, the plug deflector 700 may include a ramped surface 704 configured to deflect the second plug 516 and the corresponding second fiber optic line 514 to move from the upper fiber channel 500 into the lower lateral fiber channel 506.

Moreover, the plug deflector 700 may include a fastening feature 706 configured to hold the plug deflector 700 in the second state. As illustrated, the fastening feature 706 may include a latch assembly 708. However, the fastening feature 706 may include any suitable fastening feature for holding the plug deflector 700 in the second state. For example, the fastening feature 706 may alternatively include a shear pin. Further, the fastening feature 706 is configured to release in response to a threshold pressure being applied to the plug deflector 700. In response to the fastening feature 706 releasing, the plug deflector 700 may be configured move in the downhole direction 216 along the lower main fiber channel 504 to transition the diverter assembly 520 from the second state to the first state. FIG. 7B illustrates the diverter assembly 520 in the first state. In the first state, the plug deflector 700 may no longer be in position to deflect the at least one fiber optic line 162 at the fiber channel junction 702 such that the at least one fiber optic line 162 may pass directly from the upper fiber channel 500 to the lower main fiber channel 504 due to the alignment of the upper fiber channel 500 with the lower main fiber channel 504. For example, as illustrated, the first plug 510 and the corresponding first fiber optic line 508 may move from the upper fiber channel 500 into the lower main fiber channel 504 in a first state.

Figure 8:
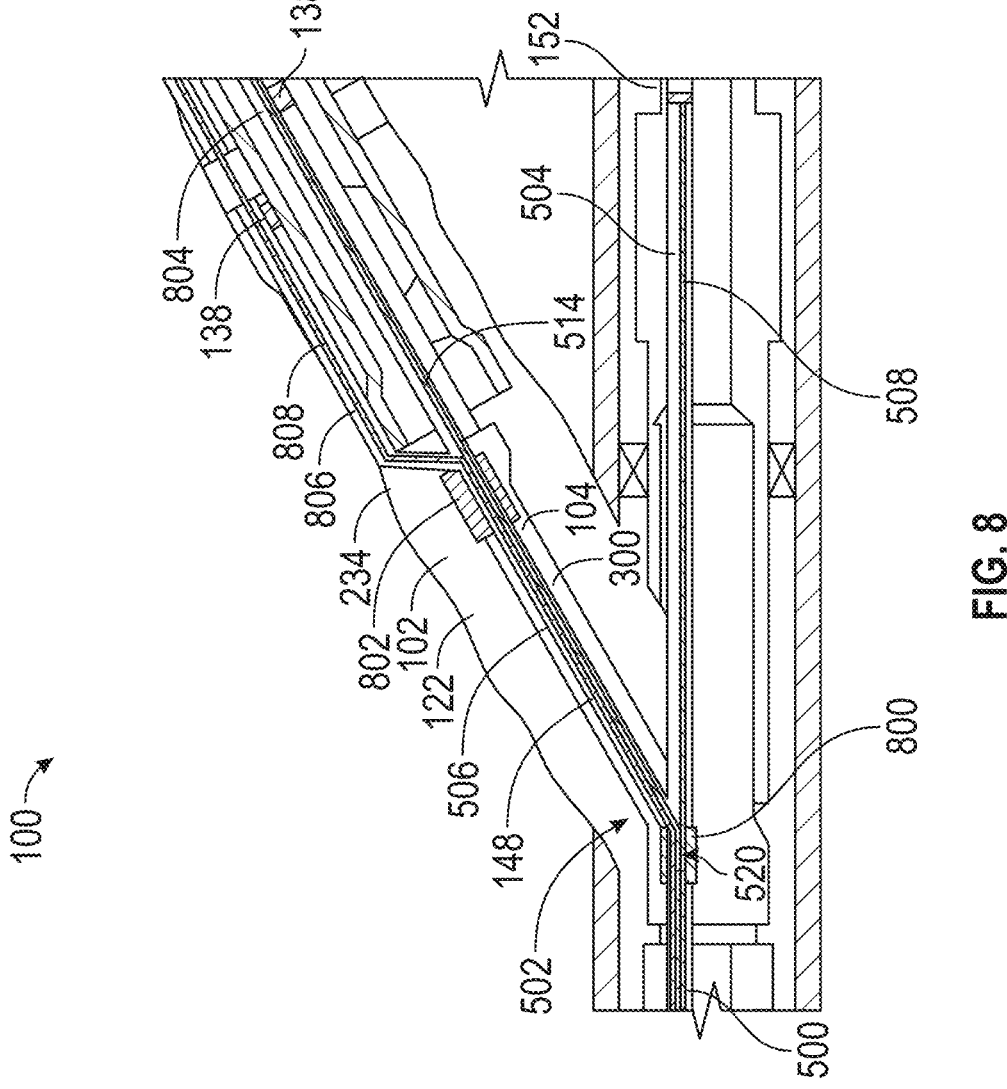
FIG. 8 illustrates an elevation view of a pump down fiber system having a plurality of diverter assemblies, in accordance with some embodiments of the present disclosure.

FIG. 8 illustrates an elevation view of a pump down fiber system having a plurality of diverter assemblies, in accordance with some embodiments of the present disclosure. As set forth above, the diverter assembly 520 (e.g., a first diverter assembly 800) may be disposed proximate the wellbore junction 502 to direct the first fiber optic line 508 into the lower main fiber channel 504 (e.g., disposed within the main bore 152) and the second fiber optic line 514 into the lower lateral fiber channel 506 (e.g., disposed within the lateral bore 122) from the upper fiber channel 500. However, as illustrated, pump down fiber system 100 may include a plurality of diverter assemblies 520. For example, a second diverter assembly 802 may be configured to separate the at least one fiber channel 148 into two parallel fiber channels along the wellbore 102.

As illustrated, the lower lateral fiber channel 506 may be disposed within the body portion 300 downhole completion assembly 104. However, downhole devices 138 may be disposed both within the downhole completion assembly 104 and within the annulus 234 of the wellbore 102. As such, a second lower lateral fiber channel 804 may be disposed within the downhole completion assembly 104 and a third lower lateral fiber channel 806 may be disposed in the annulus 234 of the wellbore 102. The second diverter assembly 802 may be configured to direct the second fiber optic line 514 into the second lower lateral fiber channel 804 from the lower lateral fiber channel 506 in the first state. Further, the second diverter assembly 802 may be actuated to the second state such that the second diverter assembly 802 may direct a third fiber optic line 808 into the third lower lateral fiber channel 806 from the lower lateral fiber channel 506.

Figure 9:
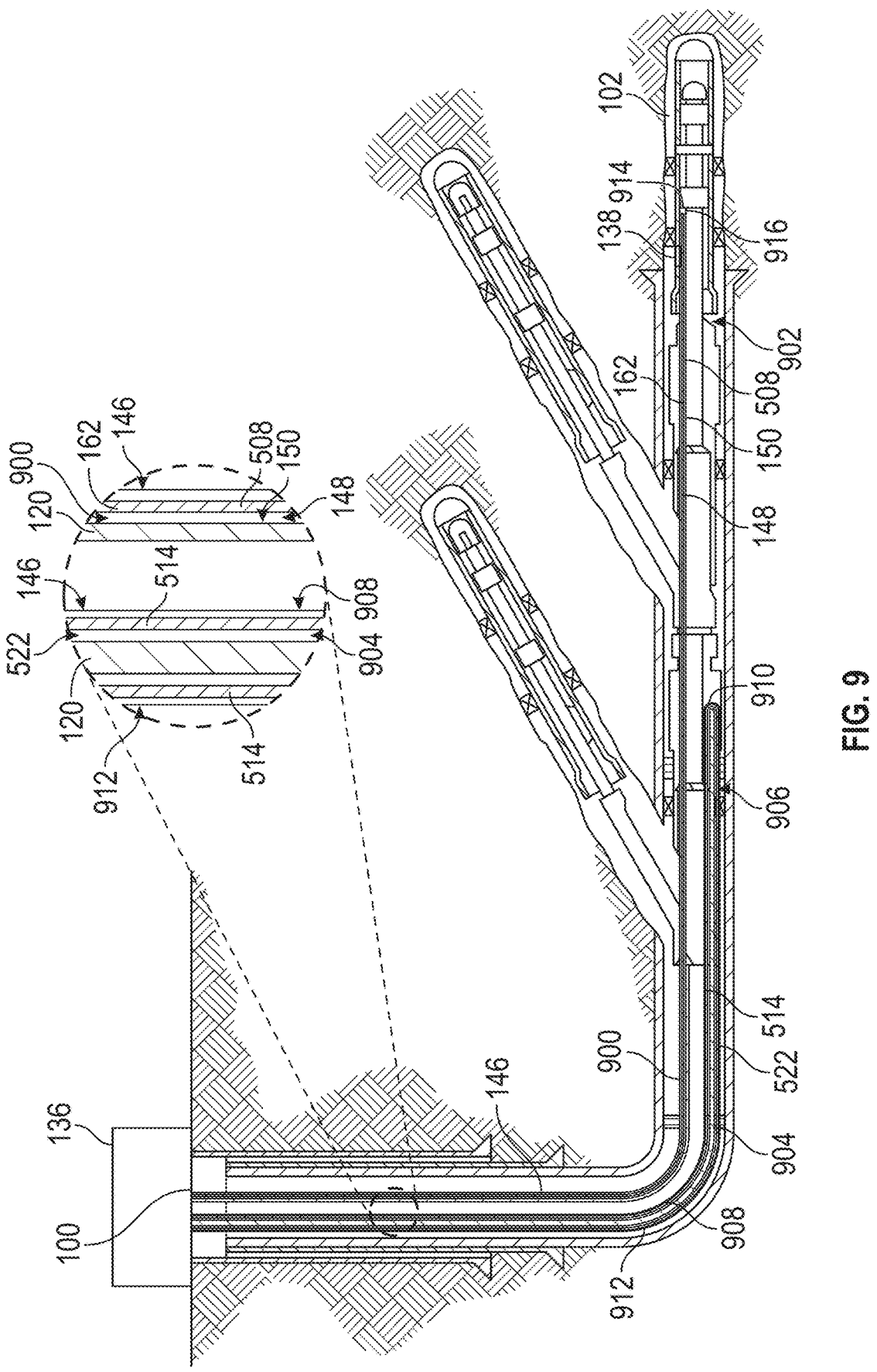
FIG. 9 illustrates an elevation view of a pump down fiber system having multiple groups of conduits configured to interconnect to form respective fiber channels along the wellbore, in accordance with some embodiments of the present disclosure.

FIG. 9 illustrates an elevation view of a pump down fiber system having multiple groups of conduits configured to interconnect to form respective fiber channels along the wellbore, in accordance with some embodiments of the present disclosure. The plurality of conduits 146 may include a first group of conduits 900 configured to interconnect to form the first fiber channel 150 for housing the first fiber optic line 508. As illustrated, the first fiber channel 150 may be configured to extend from the surface position into a lower main bore portion 902 (e.g., a lower completion zone) of the wellbore 102. Further, a second group of conduits 904 may be configured to interconnect to form the second fiber channel 522 for housing the second fiber optic line 514. The second fiber channel 522 may be configured to extend from the surface position to an upper main bore portion 906 (e.g. an upper completion zone) of the wellbore 102. However, the first fiber optic line 508 and the second fiber optic line 514 may be configured to extend to any suitable locations within the wellbore 102. Further, the pump down fiber system 100 may include any suitable number of fiber optic lines for providing communication between respective downhole devices 138 and the surface operations 136.

Moreover, during completion operations, the at least one fiber optic line 162 may experience wear or become damaged. As such, the pump down fiber system 100 may be configured to eject the at least one fiber optic line 162 such that a replacement fiber optic line may be run-in-hole. As illustrated, the plurality of conduits 146 (e.g., the second group of conduits 904) may be configured to form the second fiber channel 522 with a U-shape. That is, the second fiber channel 522 may include an insertion portion 908, a bend portion 910, and a return portion 912. For example, the second fiber optic line 514 may be run-in-hole to a desired position via the insertion portion 908 of the second fiber channel 522. To replace the second fiber optic line 514, the second fiber optic line 514 may be driven along the insertion portion 908 to the bend portion 910 and into the return portion 912. The return portion 912 may extend from the bend portion 910 back to the surface 110 such that the second fiber optic line 514 may be ejected at the surface 110 via passing through the return portion 918. Moreover, the second fiber channel 522 and its return portion 912 may include at least one diverter assembly (e.g., plug deflector) for directing the second fiber optic line 514.

Alternatively, the at least one fiber channel 148 (e.g., the first fiber channel 150) may include an ejection opening 914 formed at a downhole end of the first fiber channel 150. To replace the first fiber optic line 508, the first fiber optic line 508 may be driven from the first fiber channel 150 into the wellbore 102 via the ejection opening 914. The ejection opening 914 may include a sealing assembly 916 configured to prevent downhole fluid from entering the first fiber channel 150. Moreover, the first fiber optic line 508 may include a degradable material. The degradable material may be removed from the first fiber channel 150 via flushing fluid through the first fiber channel 150. The degradable material may be configured to degrade in first fiber channel 150 prior to flushing, degrade after being flushing from the first fiber channel 150, or some combination thereof. For example, the first fiber optic line 508 may be configured to degrade within the first fiber channel 150 and a fluid may be flushed through the first fiber channel to remove remaining material from the first fiber optic line 508. In an alternative example, the first fiber optic line may include a dissolvable material configured to dissolve in response to contact with the fluid used for flushing. As such, such that the first fiber optic line 508 may be removed from the first fiber channel 150 via flushing the first fiber channel 150 with a corresponding solution configured to dissolve the first fiber optic line 508.

Accordingly, the present disclosure may provide systems and methods for pumping fiber optic lines into downhole environments such as multilateral wells. Furthermore, the present disclosure may provide systems and methods for pumping energy transfer lines (fiber optic, electrical, hydraulic, etc., and combinations thereof) to enable the transfer of signals and energy in small, constrained areas under harsh conditions (e.g., dirty environments or contaminated fluids), extreme pressures (e.g., >20,000-psi differential), extreme temperatures (e.g., <~20° F. or >300° F.), makes this disclosure suitable for use in other harsh environments such as outer space (e.g., satellites, spacecrafts, etc.), aeronautics (aircrafts), on-ground (swamps, marshes, etc.), below ground (mines, caves, etc.), ocean (on surface and subsea), subterranean (mineral extraction, storage wells (carbon sequestration, carbon capture and storage (CCS), etc.), and other energy recovery activities (geothermal, steam, etc.). The systems and methods may include any of the various features disclosed herein, including one or more of the following statements.

Statement 1. A downhole system, comprising: a plurality of conduits configured to interconnect, via at least one stab-in connection, to form at least one fiber channel extending along a portion of a wellbore; at least one fiber optic line configured to extend through at least a portion of the fiber channel from a surface position to a downhole position; and a plug secured to leading end of the fiber optic line, wherein the plug is configured to move along the at least one fiber channel in response to fluid pressure in the at least one fiber channel to drive the leading end of the at least one fiber optic line along the at least one fiber channel from the surface position to at least the downhole position.

Statement 2. The downhole system of statement 1, wherein the at least one stab-in connection includes a stab-in connector formed at a first end of a first conduit of the plurality of conduits and a corresponding stab-in receptacle formed at a second end of a second conduit of the plurality of conduits, wherein the stab-in receptacle is configured to receive the stab-in connector to secure the first conduit to the second conduit.

Statement 3. The downhole system of statement 1 or statement 2, wherein the stab-in connector includes a seal assembly disposed about a tubular body portion of the stab-in connector, wherein the seal assembly includes at least one seal configured to interface with an inner surface of the corresponding stab-in receptacle to seal the stab-in connector against the corresponding stab-in receptacle.

Statement 4. The downhole system of any preceding statement, further comprising at least one downhole completion assembly, wherein the at least one downhole completion assembly includes an upper production tubular, a junction assembly, a lower main bore completion assembly, a lower lateral completion assembly, or some combination thereof.

Statement 5. The downhole system of any preceding statement, wherein the at least one downhole completion assembly includes at least one slot formed in a radially outer surface of the downhole completion assembly, wherein the at least one slot extends at least partially between an upper end of the downhole completion assembly and a lower end of the downhole completion assembly, and wherein the at least one slot is configured to receive at least one conduit of the plurality of conduits.

Statement 6. The downhole system of any preceding statement, wherein the at least one downhole completion assembly includes a body portion, wherein at least one conduit of the plurality of conduits extends through the body portion at least partially between an upper end of the downhole completion assembly and a lower end of the downhole completion assembly.

Statement 7. The downhole system of any preceding statement, wherein the at least one fiber channel includes at least an upper fiber channel extending uphole from a wellbore junction, a lower main fiber channel extending downhole from the wellbore junction into a main bore, and a lower lateral fiber channel extending downhole from the wellbore junction into a lateral bore, and wherein the at least one fiber optic line includes a first fiber optic line and a second fiber optic line, wherein the first fiber optic line extends through the upper fiber channel and into the lower main fiber channel, and wherein the second fiber optic line extends through the upper fiber channel and into the lower lateral fiber channel.

Statement 8. The downhole system of any preceding statement, further comprising a diverter assembly disposed between a first fiber channel, a second fiber channel, and a third fiber channel of the at least one fiber channel, wherein the diverter assembly is configured to selectively connect the first fiber channel to the second fiber channel in a first state and connect the first fiber channel to the third fiber channel in a second state.

Statement 9. The downhole system of any preceding statement, wherein the second fiber channel is disposed within a body portion of a downhole completion assembly, and wherein the third fiber channel is disposed in an annulus of the wellbore.

Statement 10. The downhole system of any preceding statement, wherein the at least one fiber optic line includes a first fiber optic line extending from the surface position to an upper completion zone and a second fiber optic line extending from the surface position to a lower completion zone.

Statement 11. The downhole system of any of statements 1-9, wherein the plurality of conduits includes a first group of conduits configured to form a first fiber channel for housing a first fiber optic line and a second group of conduits configured to form a second fiber channel for housing a second fiber optic line, wherein the first fiber channel is configured to extend from the surface position into a lower main bore portion of the wellbore, and wherein the second fiber channel is configured to extend from the surface position into a lower lateral bore portion of the wellbore.

Statement 12. The downhole system of any preceding statement, wherein the at least one fiber optic line includes optical fiber sensors for distributed fiber optic sensing.

Statement 13. The downhole system of any preceding statement, wherein the at least one fiber optic line is configured to transmit signals between the downhole position and the surface position, wherein the at least one fiber optic line is configured to connect to at least one downhole device, wherein the at least one downhole device includes a control valve, a pressure transducer, a temperature sensor, or some combination thereof, disposed along the respective conduit of the plurality of conduits, and wherein the at least one fiber optic line is configured to transmit signals to carry information between the downhole device and the surface position.

Statement 14. The downhole system of any preceding statement, wherein the at least one fiber channel includes an ejection opening formed at a downhole end of the at least one fiber channel, wherein the at least one fiber optic line may be ejected from the at least one fiber channel via the ejection opening, and wherein the ejection opening includes a sealing assembly configured to prevent downhole fluid from entering the at least one fiber channel via the ejection opening.

Statement 15. The downhole system of any preceding statement, wherein the at least one fiber optic line includes a degradable material.

Statement 16. The downhole system of any preceding statement, wherein the at least one fiber channel includes an insertion portion, a bend portion, and a return portion, and wherein the return portion extends from the bend portion toward the surface position such that the at least one fiber optic line may be ejected at surface via the return portion.

Statement 17. A downhole system, comprising: a plurality of conduits configured to interconnect, via stab-in connections, to form a plurality of fiber channels extending along respective portions of a wellbore, wherein the plurality of fiber channels includes at least an upper fiber channel extending uphole from a wellbore junction, a lower main fiber channel extending downhole from the wellbore junction into a main bore, and a lower lateral fiber channel extending downhole from the wellbore junction into a lateral bore; a first fiber optic line configured to extend through the upper fiber channel and into the lower main fiber channel to a first downhole position; a second fiber optic line configured to extend through the upper fiber channel and into the lower lateral fiber channel to a second downhole position; a plurality of plugs having at least a first plug and a second plug, wherein the first plug is secured to a first leading end of the first fiber optic line, wherein the second plug is secured to a second leading end of the second fiber optic line, wherein each plug of the plurality of plugs is configured to move along a respective fiber channel in response to fluid pressure in the respective fiber channel to drive the corresponding fiber optic line along the respective fiber channel; and a diverter assembly disposed at a junction between the upper fiber channel, the lower main fiber channel, and the lower lateral fiber channel, wherein the diverter assembly is configured to selectively direct the first plug and the corresponding first fiber optic line to move from the upper fiber channel into the lower main fiber channel in a first state and direct the second plug and the corresponding second fiber optic line to move from the upper fiber channel into the lower lateral fiber channel in a second state.

Statement 18. The downhole system of statement 17, wherein the diverter assembly is formed within a body portion of a junction assembly disposed at least partially within the junction.

Statement 19. The downhole system of statement 17 or statement 18, wherein the diverter assembly includes a shuttle valve having a shifting block configured to actuate between a first shuttle valve position in the first state and a second shuttle valve position in the second state, and wherein the shifting block is actuated via pressure applied through the upper fiber channel, pressure applied through a hydraulic line connected to the shuttle valve, an electric motor, or some combination thereof.

Statement 20. The downhole system of statement 17 or statement 18, wherein the diverter assembly includes a plug deflector, wherein the upper fiber channel, the lower main fiber channel, and the lower lateral fiber channel are connected at a fiber channel junction, wherein the upper fiber channel is axially aligned with the lower main fiber channel, wherein lower lateral fiber channel is angularly offset from the lower main fiber channel, and wherein the plug deflector is disposed at least partially within the fiber channel junction in the second state, wherein the plug deflector includes a ramped surface to deflect the second plug and the corresponding second fiber optic line to move from the upper fiber channel into the lower lateral fiber channel.

Statement 21. The downhole system of any of statements 17, 18, or 20, wherein the plug deflector includes a fastening feature configured to hold the plug deflector in the second state, wherein the fastening feature is configured to release in response to a threshold pressure applied uphole the plug deflector, wherein the plug deflector is configured to move in a downhole direction along the lower main fiber channel to transition the diverter assembly from the second state to the first state in response to the release of the fastening feature, and wherein the first plug and the corresponding first fiber optic line are configured to move from the upper fiber channel into the lower main fiber channel in a first state.

Statement 22. A downhole system, comprising: a plurality of conduits configured to interconnect, via stab-in connections, to form a plurality of fiber channels extending along respective portions of a wellbore, wherein the plurality of fiber channels includes at least an upper fiber channel extending uphole from a wellbore junction, a lower main fiber channel extending downhole from the wellbore junction into a main bore, and a lower lateral fiber channel extending downhole from the wellbore junction into a lateral bore; a first fiber optic line configured to extend through the upper fiber channel and into the lower main fiber channel to a first downhole position; a second fiber optic line configured to extend through the upper fiber channel and into the lower lateral fiber channel to a second downhole position; a plurality of plugs having at least a first plug and a second plug, wherein the first plug is secured to a first leading end of the first fiber optic line, wherein the second plug is secured to a second leading end of the second fiber optic line, wherein each plug of the plurality of plugs is configured to move along a respective fiber channel in response to fluid pressure in the respective fiber channel to drive the corresponding fiber optic line along the respective fiber channel; and a diverter assembly disposed at a junction between the upper fiber channel, the lower main fiber channel, and the lower lateral fiber channel, wherein the diverter assembly is formed within a junction assembly disposed at least partially within the junction, wherein the diverter assembly includes a shuttle valve configured to selectively direct the first plug and the corresponding first fiber optic line to move from the upper fiber channel into the lower main fiber channel in a first shuttle valve position and direct the second plug and the corresponding second fiber optic line to move from the upper fiber channel into the lower lateral fiber channel in a second shuttle valve position.

Statement 23. The downhole system of statement 22, wherein the shuttle valve includes: a housing portion; a valve cavity formed within the housing portion; an upper bore extending from an upper connection end of the housing portion to the valve cavity, wherein the upper connection end is configured to connect with the upper fiber channel; a first lower bore extending from the valve cavity to a first lower connection end of the housing portion, wherein the first lower connection end is configured to connect with the lower main fiber channel; a second lower bore extending from the valve cavity to a second lower connection end of the housing portion, wherein the second lower connection end is configured to connect with the lower lateral fiber channel; and a shifting block disposed within the valve cavity, wherein the shifting block includes a first channel configured to connect the upper bore with the first lower bore in a first shuttle valve position, and wherein the shifting block includes a second channel configured to connect the upper bore with the second lower bore in a second shuttle valve position.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A downhole system, comprising:
a plurality of conduits configured to interconnect, via at least one stab-in connection, to form at least one fiber channel extending along a wellbore portion of a wellbore;
at least one fiber optic line configured to extend through at least a channel portion of the at least one fiber channel from a surface position to a downhole position;
a plug secured to a leading end of the at least one fiber optic line,
wherein the plug is configured to move along the at least one fiber channel in response to fluid pressure in the at least one fiber channel to drive the leading end of the at least one fiber optic line along the at least one fiber channel from the surface position to at least the downhole position; and
a diverter assembly disposed between a first fiber channel, a second fiber channel, and a third fiber channel of the at least one fiber channel,
wherein the diverter assembly is configured to selectively connect the first fiber channel to the second fiber channel in a first state and connect the first fiber channel to the third fiber channel in a second state.

2. The downhole system of claim 1, wherein the at least one stab-in connection includes;
a stab-in connector formed at a first end of a first conduit of the plurality of conduits; and
a stab-in receptacle formed at a second end of a second conduit of the plurality of conduits,
wherein the stab-in receptacle is configured to receive the stab-in connector to secure the first conduit to the second conduit.

3. The downhole system of claim 2,
wherein the stab-in connector includes a seal assembly disposed about a tubular body portion of the stab-in connector,
wherein the seal assembly includes at least one seal configured to interface with an inner surface of the stab-in receptacle to seal the stab-in connector against the stab-in receptacle.

4. The downhole system of claim 1, further comprising at least one downhole completion assembly, wherein the at least one downhole completion assembly includes:
an upper production tubular;
a junction assembly;
a lower main bore completion assembly;
a lower lateral completion assembly; or
a combination thereof.

5. The downhole system of claim 4,
wherein the at least one downhole completion assembly includes at least one slot formed in a radially outer surface of the at least one downhole completion assembly,
wherein the at least one slot extends at least partially between an upper end of the at least one downhole completion assembly and a lower end of the at least one downhole completion assembly, and
wherein the at least one slot is configured to receive at least one conduit of the plurality of conduits.

6. The downhole system of claim 4,
wherein the at least one downhole completion assembly includes a body portion, and
wherein at least one conduit of the plurality of conduits extends through the body portion at least partially between an upper end of the at least one downhole completion assembly and a lower end of the at least one downhole completion assembly.

7. The downhole system of claim 1,
wherein the at least one fiber channel includes;
an upper fiber channel extending uphole from a wellbore junction;
a lower main fiber channel extending downhole from the wellbore junction into a main bore; and
a lower lateral fiber channel extending downhole from the wellbore junction into a lateral bore,
wherein the at least one fiber optic line includes:
a first fiber optic line; and
a second fiber optic line,
wherein the first fiber optic line extends through the upper fiber channel and into the lower main fiber channel, and
wherein the second fiber optic line extends through the upper fiber channel and into the lower lateral fiber channel.

8. The downhole system of claim 1,
wherein the second fiber channel is disposed within a body portion of a downhole completion assembly, and
wherein the third fiber channel is disposed in an annulus of the wellbore.

9. The downhole system of claim 1, wherein the at least one fiber optic line includes a first fiber optic line extending from the surface position to an upper completion zone and a second fiber optic line extending from the surface position to a lower completion zone.

10. The downhole system of claim 1, wherein the plurality of conduits includes:
a first group of conduits configured to form the first fiber channel for housing a first fiber optic line; and
a second group of conduits configured to form the second fiber channel for housing a second fiber optic line,
wherein the first fiber channel is configured to extend from the surface position into a lower main bore portion of the wellbore, and
wherein the second fiber channel is configured to extend from the surface position into a lower lateral bore portion of the wellbore.

11. The downhole system of claim 1, wherein the at least one fiber optic line includes optical fiber sensors for distributed fiber optic sensing.

12. The downhole system of claim 1,
wherein the at least one fiber optic line is configured to connect to at least one downhole device,
wherein the at least one downhole device includes a control valve, a pressure transducer, a temperature sensor, or a combination thereof,
wherein the at least one downhole device is disposed along a respective conduit of the plurality of conduits, and
wherein the at least one fiber optic line is configured to transmit signals to carry information between the at least one downhole device and the surface position.

13. The downhole system of claim 1,
wherein the at least one fiber channel includes an ejection opening formed at a downhole end of the at least one fiber channel,
wherein the at least one fiber optic line is configured to eject from the at least one fiber channel via the ejection opening, and
wherein the ejection opening includes a sealing assembly configured to prevent downhole fluid from entering the at least one fiber channel via the ejection opening.

14. The downhole system of claim 1, wherein the at least one fiber optic line includes a degradable material.

15. The downhole system of claim 1,
wherein the at least one fiber channel includes an insertion portion, a bend portion, and a return portion, and
wherein the return portion extends from the bend portion toward the surface position such that the at least one fiber optic line is configured to eject at the surface position via the return portion.

16. A downhole system, comprising:
a plurality of conduits configured to interconnect, via stab-in connections, to form a plurality of fiber channels extending along respective portions of a wellbore,
wherein the plurality of fiber channels includes at least an upper fiber channel extending uphole from a wellbore junction, a lower main fiber channel extending downhole from the wellbore junction into a main bore, and a lower lateral fiber channel extending downhole from the wellbore junction into a lateral bore;
a first fiber optic line configured to extend through the upper fiber channel and into the lower main fiber channel to a first downhole position;
a second fiber optic line configured to extend through the upper fiber channel and into the lower lateral fiber channel to a second downhole position;
a plurality of plugs having at least a first plug and a second plug,
wherein the first plug is secured to a first leading end of the first fiber optic line,
wherein the second plug is secured to a second leading end of the second fiber optic line, and
wherein each plug of the plurality of plugs is configured to move along a respective fiber channel in response to fluid pressure in the respective fiber channel to drive a corresponding fiber optic line along the respective fiber channel; and
a diverter assembly disposed at a junction between the upper fiber channel, the lower main fiber channel, and the lower lateral fiber channel,
wherein the diverter assembly is configured to selectively direct the first plug and the first fiber optic line to move from the upper fiber channel into the lower main fiber channel in a first state and direct the second plug and the second fiber optic line to move from the upper fiber channel into the lower lateral fiber channel in a second state.

17. The downhole system of claim 16, wherein the diverter assembly is formed within a body portion of a junction assembly disposed at least partially within the junction.

18. The downhole system of claim 16,
wherein the diverter assembly includes a shuttle valve having a shifting block configured to actuate between a first shuttle valve position in the first state and a second shuttle valve position in the second state, and wherein the shifting block is actuated via:
a channel pressure applied through the upper fiber channel,
a line pressure applied through a hydraulic line connected to the shuttle valve,
an electric motor, or
a combination thereof.

19. The downhole system of claim 16,
wherein the diverter assembly includes a plug deflector,
wherein the upper fiber channel, the lower main fiber channel, and the lower lateral fiber channel are connected at a fiber channel junction,
wherein the upper fiber channel is axially aligned with the lower main fiber channel,
wherein the lower lateral fiber channel is angularly offset from the lower main fiber channel,
wherein the plug deflector is disposed at least partially within the fiber channel junction in the second state, and
wherein the plug deflector includes a ramped surface to deflect the second plug and the second fiber optic line to move from the upper fiber channel into the lower lateral fiber channel.

20. The downhole system of claim 19,
wherein the plug deflector includes a fastening feature configured to hold the plug deflector in the second state,
wherein the fastening feature is configured to release in response to a threshold pressure applied uphole the plug deflector,
wherein the plug deflector is configured to move in a downhole direction along the lower main fiber channel to transition the diverter assembly from the second state to the first state in response to the release of the fastening feature, and
wherein the first plug and the first fiber optic line are configured to move from the upper fiber channel into the lower main fiber channel in the first state.

21. A downhole system, comprising:
a plurality of conduits configured to interconnect, via stab-in connections, to form a plurality of fiber channels extending along respective portions of a wellbore,
wherein the plurality of fiber channels includes at least an upper fiber channel extending uphole from a wellbore junction, a lower main fiber channel extending downhole from the wellbore junction into a main bore, and a lower lateral fiber channel extending downhole from the wellbore junction into a lateral bore;
a first fiber optic line configured to extend through the upper fiber channel and into the lower main fiber channel to a first downhole position;
a second fiber optic line configured to extend through the upper fiber channel and into the lower lateral fiber channel to a second downhole position;
a plurality of plugs having at least a first plug and a second plug,
wherein the first plug is secured to a first leading end of the first fiber optic line,
wherein the second plug is secured to a second leading end of the second fiber optic line, and
wherein each plug of the plurality of plugs is configured to move along a respective fiber channel in response to fluid pressure in the respective fiber channel to drive a corresponding fiber optic line along the respective fiber channel; and
a diverter assembly disposed at a junction between the upper fiber channel, the lower main fiber channel, and the lower lateral fiber channel, wherein the diverter assembly is formed within a junction assembly disposed at least partially within the junction, and wherein the diverter assembly includes a shuttle valve configured to selectively direct the first plug and the first fiber optic line to move from the upper fiber channel into the lower main fiber channel in a first shuttle valve position and direct the second plug and the second fiber optic line to move from the upper fiber channel into the lower lateral fiber channel in a second shuttle valve position.

22. The downhole system of claim 21, wherein the shuttle valve includes:

a housing portion;

a valve cavity formed within the housing portion;

an upper bore extending from an upper connection end of the housing portion to the valve cavity, wherein the upper connection end is configured to connect with the upper fiber channel;

a first lower bore extending from the valve cavity to a first lower connection end of the housing portion, wherein the first lower connection end is configured to connect with the lower main fiber channel;

a second lower bore extending from the valve cavity to a second lower connection end of the housing portion, wherein the second lower connection end is configured to connect with the lower lateral fiber channel; and a shifting block disposed within the valve cavity, wherein the shifting block includes a first channel configured to connect the upper bore with the first lower bore in the first shuttle valve position, and wherein the shifting block includes a second channel configured to connect the upper bore with the second lower bore in the second shuttle valve position.

23. The downhole system of claim 22, wherein the first plug is configured to guide the first fiber optic line through an angled portion of the first channel within the shifting block of the shuttle valve, and wherein a geometry of the first plug prevents the first fiber optic line from entering a transition channel during deployment into the lower main fiber channel.

24. The downhole system of claim 23, wherein the first plug is configured both to seal against an inner surface of a corresponding fiber channel to enable pressure-driven movement and to guide the corresponding fiber optic line through the angled portion of the first channel within the shifting block, thereby directing the corresponding fiber optic line into the lower main fiber channel while avoiding the transition channel.

25. The downhole system of claim 21, wherein the lower lateral fiber channel comprises a bend portion.

26. The downhole system of claim 22, wherein the upper fiber channel further comprises a return portion.

* * * * *